United States Patent
Daum et al.

(10) Patent No.: US 8,603,409 B2
(45) Date of Patent: Dec. 10, 2013

(54) SUPPORT RING FOR ACCOMMODATING A PLATE-LIKE ELEMENT IN A VESSEL

(75) Inventors: Karl-Heinz Daum, Mainz (DE); David Cachero Ventosa, Frankfurt am Main (DE); Wolfram Schalk, Neu-Anspach (DE)

(73) Assignee: Outotec Oyj, Espoo (FI)

( * ) Notice: Subject to any disclaimer, the term of this patent is extended or adjusted under 35 U.S.C. 154(b) by 731 days.

(21) Appl. No.: 12/678,576

(22) PCT Filed: Aug. 20, 2008

(86) PCT No.: PCT/EP2008/006839
§ 371 (c)(1),
(2), (4) Date: Mar. 17, 2010

(87) PCT Pub. No.: WO2009/039922
PCT Pub. Date: Apr. 2, 2009

(65) Prior Publication Data
US 2010/0209320 A1   Aug. 19, 2010

(30) Foreign Application Priority Data

Sep. 25, 2007 (DE) .......................... 10 2007 045 872

(51) Int. Cl.
*B01J 8/02* (2006.01)
(52) U.S. Cl.
USPC .......................................... 422/311; 422/221
(58) Field of Classification Search
USPC ......... 422/310, 311, 221, 143, 632, 638, 644; 202/266
See application file for complete search history.

(56) References Cited

U.S. PATENT DOCUMENTS

| 2,104,858 | A | 1/1938 | Ferguson |
| 4,335,076 | A | 6/1982 | McFarland |
| 5,069,830 | A | 12/1991 | Moore et al. |
| 5,302,353 | A | 4/1994 | Cameron |
| 5,480,620 | A | 1/1996 | Cameron |
| 6,214,174 | B1 | 4/2001 | Matsumoto et al. |
| 2008/0056968 | A1* | 3/2008 | Tabak ........................... 422/311 |

FOREIGN PATENT DOCUMENTS

| DE | 3137474 A1 | 6/1982 |
| EP | 0443499 A1 | 8/1991 |
| EP | 0856343 A1 | 8/1998 |
| GB | 924157 A | 4/1963 |
| GB | 2139914 A | 11/1984 |
| GB | 2 277 888 A | 11/1994 |

OTHER PUBLICATIONS

Xia Yufang, Design and Installation of Central Tube Type Stainless Converters, SP&BMH Related Engineering, Dec. 31, 2003, p. 23.

(Continued)

*Primary Examiner* — Lyle Alexander
*Assistant Examiner* — Joye L Woodard
(74) *Attorney, Agent, or Firm* — Leydig, Voit & Mayer, Ltd.

(57) ABSTRACT

A vessel for producing $SO_3$ from $SO_2$-containing gas includes a plate-like element and a bracket disposed on a wall of the vessel. The bracket is configured to support the plate-like element by a supporting surface. The supporting surface is an upper supporting surface curved downward away from the plate-like element in an unloaded state of the vessel or a lower supporting surface curved upward away from the plate-like element in the unloaded state of the vessel.

14 Claims, 4 Drawing Sheets

(56) References Cited

OTHER PUBLICATIONS

Wu Youling, Structural characteristics and assembling process of a stainless converter, Sulphuric Acid Industry, edition 4, Aug. 31, 1997, pp. 19-24.
Chinese Office Action of Application No. 200880106556.1 dated Apr. 15, 2013.
Intellectual Property Office of NZ—Examination Report in Appl No. 583190 (Nov. 9, 2012).
International Search Report for PCT/EP2008/006839 mailed on Dec. 29, 2008.
Ullmann's Encyclopedia of Industrial Chemistry, 5th edition, vol. A 25, pp. 649 to 653, (1994).

* cited by examiner

SUPPORT RING FOR ACCOMMODATING A PLATE-LIKE ELEMENT IN A VESSEL

CROSS REFERENCE TO PRIOR APPLICATIONS

This application is a U.S National Phase application under 35 U.S.C. §371 of International Application No. PCT/EP2008/006839, filed on Aug. 20, 2008 and which claims benefit to German Patent Application No. 10 2007 045 872.1, filed on Sep. 25, 2007. The International Application was published in English on Apr. 2, 2009 as WO 2009/039922 A1 under PCT Article 21(2).

FIELD

The present invention relates to a support ring for accommodating a plate-like element in a vessel, such as a tray or separating plate in a converter for producing $SO_3$ from $SO_2$-containing gas, wherein the plate-like element rests on a bracket attached to the wall of the vessel.

BACKGROUND

In the converter of a sulphuric-acid plant, sulfur dioxide ($SO_2$) is converted to sulfur trioxide ($SO_3$) by means of a catalyst. The gas containing sulfur dioxide is introduced into the converter together with oxygen, guided through a plurality of contact stages or trays of the converter arranged one after the other, and at least partly converted to sulfur trioxide by catalytic oxidation. The reaction of sulfur dioxide to sulfur trioxide is strongly exothermal, so that heat exchangers are provided between the individual contact stages, in order to dissipate the heat produced. To achieve a compact construction, one or more heat exchangers often are formed inside the converter, and the contact trays are arranged annularly around the central tube accommodating the heat exchangers. The construction and operation of a converter is described, for instance, in Ullmann's Encyclopedia of Industrial Chemistry, $5^{th}$ edition, vol. A25, pages 649 to 653.

The individual contact stages of the converter are separated from each other by separating plates. In the contact stages, the catalyst usually contains vanadium pentoxide as an active component, is arranged on so-called trays. Converters for producing sulfur trioxide are usually very large for economic reasons. For instance, the vessel can have a diameter of 15 m. With a diameter of the central tube of 7 m, an annular width of 4 m is thus obtained for the trays carrying the catalyst. It is quite obvious that due the weight of the catalyst, the pressure loss of the process gas and the high temperatures existing in the converter, a high load is exerted on the trays, which leads to a plastic deformation. In general, it is assumed for instance in the case of austenitic steel that an elongation of about 30% leads to rupture. To avoid an excessive deflection and rupture of the trays, stiffening is required. For this purpose, a grid structure is usually incorporated in the converter, on which the trays configured as perforated plates are disposed, which are traversed by the process gas. Due to the high temperature caused by the exothermal reaction, which for instance in the first contact stage is about 625° C., it is necessary to use expensive stainless steels for the trays carrying the catalyst and the separating plates between the contact stages. Since the grid structure must also be made of stainless steel because of the high temperatures and must have a sufficient thickness to bear the catalyst weight, high weights and hence costs are obtained for these boiler inserts.

SUMMARY

An aspect of the present invention is to optimize the consumption of material for manufacturing a sulphuric acid converter.

In an embodiment, the present invention provides a support ring for accommodating a plate-like element in a vessel that includes a bracket disposed on a wall of the vessel and configured to support the plate-like element, the bracket having an upper supporting surface inclined downward relative to horizontal.

BRIEF DESCRIPTION OF THE DRAWINGS

The present invention is described in greater detail below on the basis of embodiments and of the drawings in which.

DETAILED DESCRIPTION

Figure 1:
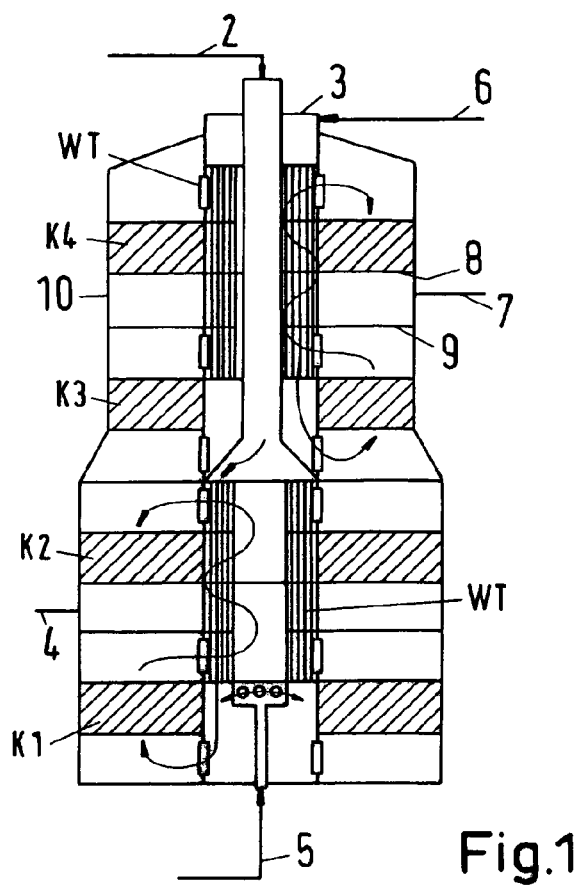
FIG. 1 schematically shows a converter for the conversion of $SO_2$ to $SO_3$.

When the tray is loaded and deflected by the applied catalyst and by the pressure loss of the process gas, this leads to a plastic deformation of the tray. But before the deforming tray reaches the allowed elongation limit of about 15 times the elastic elongation, the plastic deformation of the tray is limited by abutting against the support. At the end of this supporting range, a deformation of the sheet starting at zero can possibly be initiated again. By a corresponding inclination of the bracket a defined transition from the bending stress to a mere tensile stress can in addition be achieved, for which tensile stress distinctly higher load limit values do exist. The present invention thus allows a restricted plasticity of the supported tray (plastic hinge) in order to selectively convert the bending stress into a tensile membrane stress.

If, as is common practice in conventional converters, the plate-like element constitutes a circular ring which on its inside rests on a second bracket, the upper supporting surface of the second bracket is also inclined downwards with respect to the horizontal in accordance with an embodiment of the present invention. The tray thus can equally be held on both sides.

In an embodiment of the present invention, the upper supporting surface is curved downwards. By a corresponding selection of the curvature, it is possible, so to speak, to "follow" the physical line of the plastic deformation of the sheet in order to achieve a maximum admissible elongation.

In an embodiment of the present invention, the upper supporting surface has at least two successive radii of different magnitude. As a result, a smooth transition between the individual regions of curvature can be achieved, wherein an edge which might potentially cause a rupture of the plate-like element is avoided at the transition between the radii.

In accordance with an embodiment of the present invention, the magnitude of the radii decreases proceeding from the radius closest to the wall of the vessel to the radii located further away (R1>R2> . . . >Ri> . . . Rn). When using two radii, the first radius located close to the wall of the vessel can define the bend of the plate-like element, whereas the second radius, which is further away from the wall and smaller, serves the detachment of the plate from the bracket.

In a converter of the usual size, the radius closest to the wall of the vessel lies in the range from 500 to 900 mm, for example 600 to 800 mm, or about 700 mm in accordance with the present invention. The radius succeeding the radius closest to the wall of the vessel lies in the range from 300 to 700 mm, for example 400 to 600 mm, or about 500 mm in accordance with the present invention. These values should of course be adapted to the size of the vessel accommodating the plate-like element.

It is of course also possible to adapt the bedding of the elastic deformation to the physical/mechanical bend of the plate-like element. Instead of adapting the radii, this can for instance also be effected by using a curve geometry, such as cycloids.

In an embodiment of the present invention, the upper supporting surface of the bracket is inclined downwards. In particular when no very high loads act on the plate-like element, for instance in the case of the separating plates in the converter, gradually supporting the deflecting plate by a plurality of adjoining regions of different curvature can be omitted and merely one straight supporting surface can be provided. In this way, the manufacturing costs for the bracket can further be reduced. In this case, the angle of inclination of the upper supporting surface is about 4 to 9°, for example about 6 to 7°, in order to achieve a defined transition from the bending stress of the deflecting plate to a mere tensile stress.

If, for instance in the case of separating plates of a converter a load acts on the sheet from below due to the gas pressure, the sheet can rest against the bracket from below in an embodiment of the present invention and said bracket can have a lower contact surface which is inclined upwards with respect to the horizontal. The configuration of this contact surface is effected similar to the configuration of the contact surface described above. As a result, the supporting/contact surface recedes in the direction of the force exerted on the sheet in both embodiments in order to allow a plastic deformation of the sheet.

In an embodiment of the present invention, a uniform support of the plate-like element on the wall of the vessel is achieved in that the bracket is a ring extending around the inner wall of the vessel. On the opposite side of the plate, a corresponding support of the plate is of course provided, for instance an outer ring extending around the central tube of the converter.

In an embodiment of the present invention, the connection between bracket and plate-like element can be improved in that through holes for mounting bolts are formed in the same. By means of such mounting bolts, the bracket and the plate-like element can be welded, riveted or screwed to each other. The connection can of course also be improved by other mounting possibilities, e.g. grooves, seams or bevels.

Furthermore, it can be provided in accordance with the present invention that the bracket is supported from below by a supporting cone or a supporting bar.

In an embodiment of the present invention, a supporting cone or supporting bar connected with the wall of the vessel supports on the plate-like element from above, in order to retain the same on the bracket.

The connection between wall of the vessel, supporting cone or supporting bar, bracket and plate can, for example, be effected by welding.

The contact boiler (converter, for example) 1 for converting $SO_2$ to $SO_3$ as shown in FIG. 1 includes a total of four contact stages (trays) K1 to K4, in which a catalyst containing in particular vanadium pentoxide is provided in order to convert the sulfur dioxide to sulfur trioxide. $SO_2$-containing process gas is supplied to the converter 1 via a duct 2, which process gas traverses the contact stages K1 and K2 upon being heated in internal heat exchangers WT. The contact stages K1 to K4 are arranged annularly around a central tube 3 serving the gas supply and the accommodation of the heat exchangers WT.

Via a duct 4, the $SO_3$-containing gas obtained is supplied to a non-illustrated heat recovery system and to the intermediate absorption, in order to largely remove the sulfur trioxide from the process gas. Via a duct 6, the $SO_2$-containing process gas is supplied to the top of the converter 1 and traverses the contact stages K3 and K4, before it is supplied to a non-illustrated heat recovery system and the final absorption via a duct 7. In so far, this is the conventional design of the converter of a sulphuric acid plant.

The catalyst of the contact stages K1 to K4 is supported on trays 8 made of stainless steel. The trays 8 each constitute a circular ring around the central tube 3. The contact stages K1 to K4 are separated from each other by separating plates 9 made of stainless steel.

Figure 2:
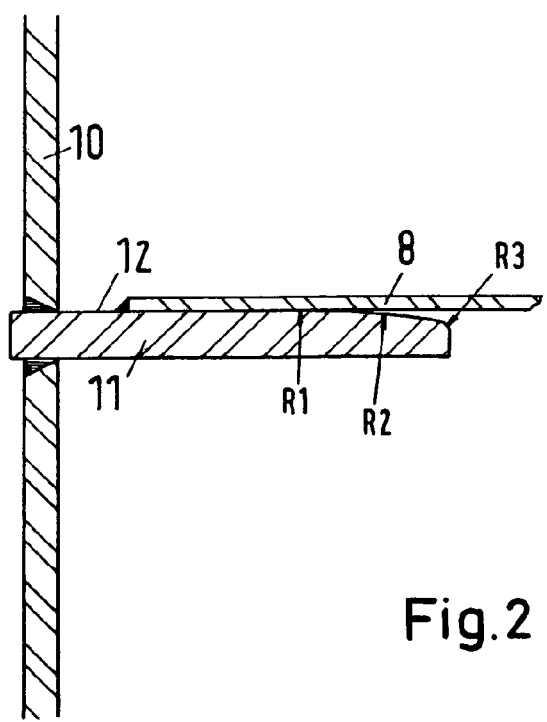
FIG. 2 schematically shows the support of a plate on a vessel wall in accordance with the present invention.
Figure 9:
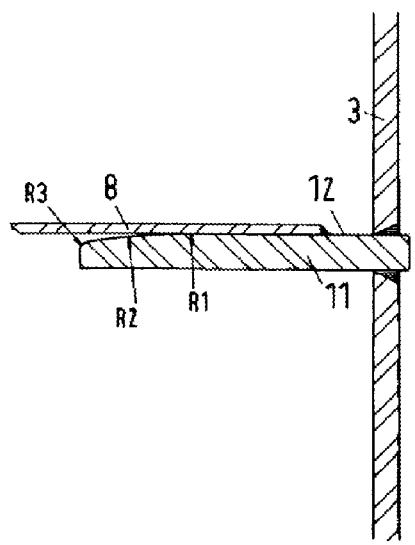
FIGS. 9 to 11 schematically show the support of a plate on a vessel wall in accordance with embodiments of the present invention.

As illustrated more clearly in FIG. 2, a bracket 11 is provided on the inner wall 10 of the converter 1, on which a tray 8 is supported. The bracket 11 constitutes a supporting ring, which extends around the entire inner circumference of the converter 1. On the outside of the central tube 3, a circumferential bracket is provided in a corresponding way shown in FIG. 9, on which rests the ring-shaped tray 8. Accordingly, the tray 8 is annularly supported on the inside and on the outside.

The supporting surface 12 of the bracket 11, on which rests the tray 8, is inclined downwards with respect to the horizontal proceeding from the inner wall 10 of the converter 1. Here, the supporting surface 12 has two succeeding radii R1 and R2 of different magnitude. The radius R1, which is closer to the vessel wall 10, is larger than the radius R2 located further to the inside. The magnitude of the radii R1, R2 is chosen in dependence on the size of the converter 1, the material characteristics of the tray 8 and the load applied by the contact stages K1 to K4 such that a plastic deformation of the tray 8 is limited by abutting against the bracket 11, before the deformation reaches a limit value in the amount of 10 to 20 times the elastic deformation. In commonly used converters, the radius R1 lies in the range from 500 to 900 mm, for example 600 to 800 mm, or about 700 mm. The radius R2 generally lies in the range from 300 to 700 mm, for example 400 to 600 mm, or about 500 mm. At the free end of the bracket 11, a radius R3 is provided in order to avoid a sharp edge which might lead to a rupture of the tray 8. It is possible to provide a plurality of radii R1 to Rn on the supporting surface 12 of the bracket 11 in order to prevent the deformation of the tray 8 in a corresponding number of stages n, with R1>R2>...>Ri>...>Rn.

FIGS. 3 to 7 show different embodiments of the support ring of the present invention, which effect an additional support of the connection between vessel wall 10, bracket 11 and tray 8.

Figure 3:
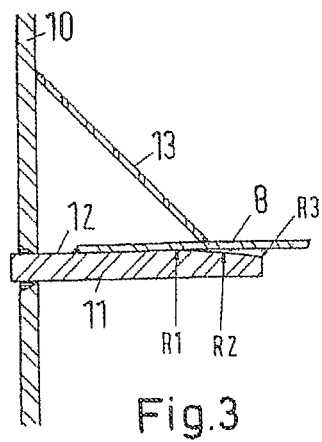
FIGS. 3 to 7 show variants of the support ring in accordance with the present invention.

In FIG. 3, the bracket 11 is supported from above by a supporting bar 13, which is braced against the wall 10 of the converter 1.

Figure 4:
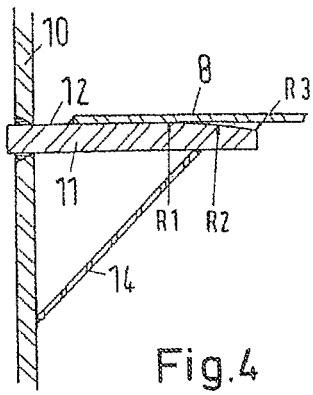

In the variant shown in FIG. 4, a supporting bar 14 connected with the wall 10 of the converter 1 supports on the tray 8 from below.

Figure 5:
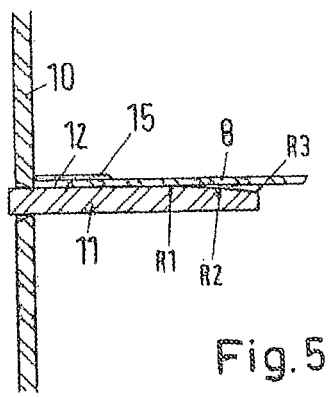

In the variant shown in FIG. 5, a flat retaining plate 15 is provided above the tray 8, which retains the same on the bracket 11.

Figure 6:
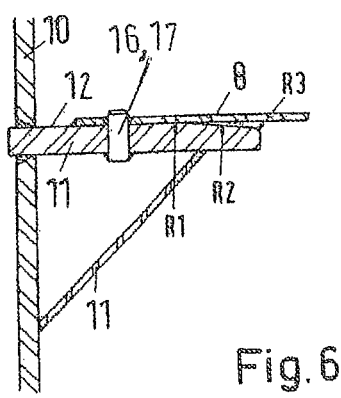

In the variant shown in FIG. 6, through holes 16 and 17 are formed in the bracket 11 and the tray 8, respectively, through which extends a mounting bolt 18 which is welded to the tray 8 and the bracket 11.

Figure 7:
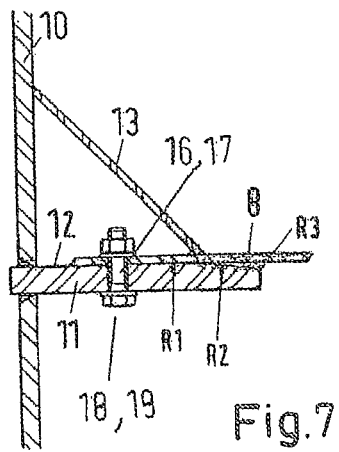

In the variant shown in FIG. 7, a mounting screw 19 extends through the through holes 16, 17, so that the bracket 11 and the tray 8 are screwed to each other.

It should be appreciated that the through holes 16, 17 and the mounting bolts 18 or screws 19 extending through the same are provided at numerous positions in the bracket 11 or the tray 8, which can, for example, be uniformly distributed over the circumference of the converter 1.

It should also be appreciated that in the variants shown in FIGS. 5 to 7 the supporting bar 13, 14 can also be provided above and/or below the bracket 11. The supporting bar 13, 14 can also constitute a plate extending around the circumference of the converter 1, which is welded to the wall 10 of the converter 1 and to the bracket 11 or the tray 8.

Figure 8:
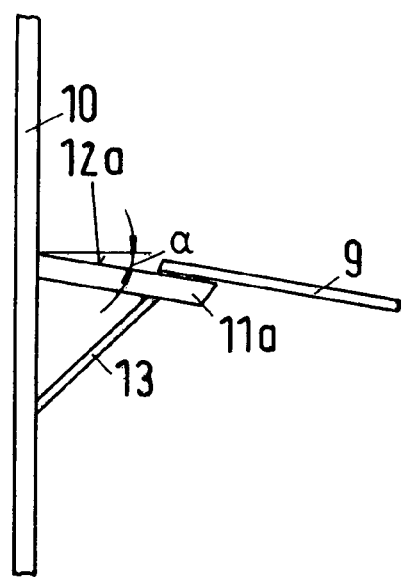
FIG. 8 shows the support ring of the present invention in accordance with another embodiment.

FIG. 8 shows a further variant of the configuration of the bracket, which can be provided for use for supporting the separating plates 9 between the contact stages K1 to K4 of the converter 1.

In the embodiment shown in FIG. 8, the supporting surface 12 of the bracket 11a has a downward inclination proceeding from the inner wall 10 of the converter 1 in the range from 4 to 9°, for example 5 to 8°, or 6 to 7°. In this case, the inclined supporting ring 11a forms a tangent for the separating plate 9 when the same is deformed due to the high temperatures and the pressures in the vessel 1. It can also be provided that the separating plate 9 already is provided with a pre-curvature, so that the step of the initial plastic deformation of the separating plate 9 can be omitted and the tensions are directly converted into a tensile stress due to the tangent effect of the supporting plate 11a.

Figure 10:
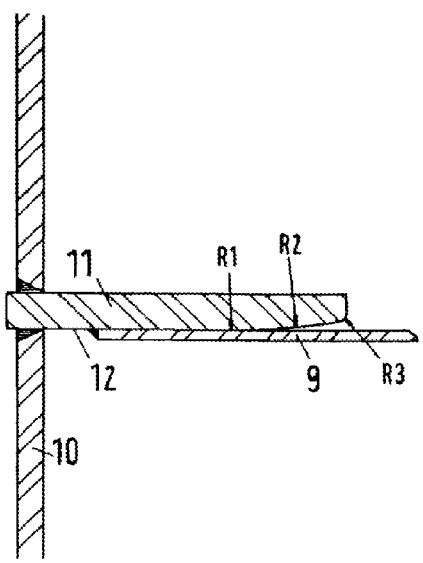
Figure 11:
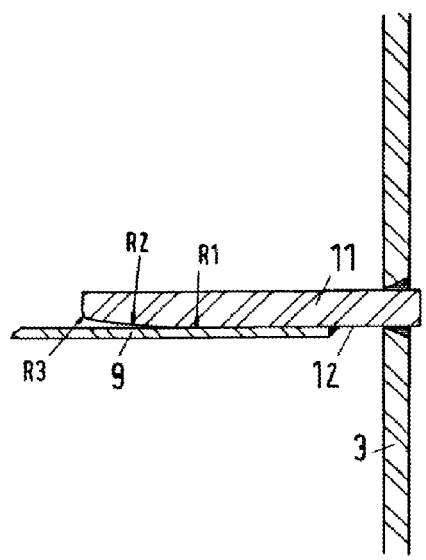

FIGS. 2 to 8 each show embodiments in which the supporting surface 12, 12a for the trays 8 or the separating plates 9 is inclined downwards. These embodiments are suitable in particular for applications in which the pressure load is exerted on the sheets 8, 9 from above. On the other hand, if a load acts on the sheet from below, for instance in the case of the separating plates 9 of a converter, the sheet 8, 9 can rest against the bracket 11 from below in a manner shown in FIGS. 10 and 11, and the lower contact surface of the bracket 11 can recede upwards with respect to the horizontal in order to allow a plastic deformation of the sheet in the direction of the force exerted on the sheet 8, 9. The configuration of this contact surface is effected similar to the configuration of the supporting surface 12, 12a described above.

As a result of the inventive idea to stop the plastic deformation of the plate-like element by abutting against the bracket 11, 11a and substantially completely convert the bending stresses into tensile stresses, a much smaller deformation of the system can be achieved. An additional support of the tray by means of a heavy and expensive grid structure can be omitted. With equal safety, a considerable saving of material thus can be achieved.

By means of the present invention, at least 70% of the material can be saved by omitting the grid structure supporting the tray.

The present invention is not limited to embodiments described herein; reference should be had to the appended claims.

LIST OF REFERENCE NUMERALS 1 converter
2 duct
3 central tube
4 duct
5 duct
6 duct
7 duct
8 tray
9 separating plate
10 wall
11,11a bracket
12,12a supporting surface
13 supporting bar
14 supporting bar
15 retaining plate
16 through hole
17 through hole
18 mounting bolt
19 screw
K1 to K5 contact stages
WT heat exchanger

The invention claimed is:

1. A vessel for producing $SO_3$ from $SO_2$-containing gas, the vessel comprising:
a plate-like element; and
a bracket disposed on a wall of the vessel and configured to support the plate-like element, the bracket having a supporting surface that is an upper supporting surface curved downward away from the plate-like element in an unloaded state of the vessel or a lower supporting surface curved upward away from the plate-like element in the unloaded state of the vessel.

2. The vessel as recited in claim 1, wherein the plate-like element is a circular ring, and further comprising a second bracket configured to support the circular ring at an inside portion thereof, the second bracket including a second supporting surface corresponding to the supporting surface of the bracket that is an upper supporting surface curved downward relative to horizontal or a lower supporting surface curved upward relative to horizontal.

3. The vessel as recited in claim 1, wherein the bracket is a ring extending around the wall of the vessel.

4. The vessel as recited in claim 1, wherein each of the bracket and the plate-like element include at least one respective through hole for at least one mounting bolt.

5. The vessel as recited in claim 1, wherein the bracket is welded to the plate-like element.

6. The vessel as recited in claim 1, wherein the bracket is screwed to the plate-like element.

7. The vessel as recited in claim 1, further comprising a supporting bar braced against the wall of the vessel, wherein the supporting bar is configured to support the bracket from below.

8. The vessel as recited in claim 1, further comprising a supporting bar connected to the wall of the vessel, wherein the supporting bar is configured to support the plate-like element from above.

9. The vessel as recited in claim 1, further comprising a supporting cone braced against the wall of the vessel, wherein the supporting cone is configured to support the bracket from below.

10. The vessel as recited in claim 1, further comprising a supporting cone connected to the wall of the vessel, wherein the supporting cone is configured to support the plate-like element from above.

11. The vessel as recited in claim 1, wherein the supporting surface has at least two successive radii of different magnitude along the curve.

12. The vessel as recited in claim 11, wherein the magnitude of the at least two successive radii decreases along the curve, a radius closest to the wall of the vessel being larger than the radii located further away from the wall.

13. The vessel as recited in claim 11, wherein the radius closest to the wall of the vessel has a magnitude of from 500 to 900 mm.

14. The vessel as recited in claim 13, wherein a radius next closest to the wall of the vessel has a magnitude of from 300 to 700 mm.

* * * * *